Feb. 21, 1961　　F. G. REUTER ET AL　　2,972,360
BUFFER STOP FOR POWER LOOMS
Filed Aug. 21, 1957

Franz Gottfried Reuter and
Heinrich Nagenborg, Jr.
INVENTORS

By Chelle W. Upchurch
ATTORNEY.

United States Patent Office 2,972,360
Patented Feb. 21, 1961

2,972,360

BUFFER STOP FOR POWER LOOMS

Franz Gottfried Reuter and Heinrich Nagenborg, Jr., Lemforde, Hannover, Germany, assignors, by mesne assignments, to Mobay Chemical Company, Pittsburgh, Pa., a corporation of Delaware Filed Aug. 21, 1957, Ser. No. 679,472

Claims priority, application Germany Aug. 22, 1956

3 Claims. (Cl. 139—166)

This invention relates generally to a buffer stop suitable for use on power looms and more particularly to a novel and improved means for checking a picker stick.

In the present specification and claims, the terms "foamed polyurethane rubber" and "polyurethane rubber foam" are used to designate a porous polyurethane plastic characterized by having a density of at least 0.5 gr./cm.[3] and prepared by reacting a substantially linear hydroxyl polyester of the alkyd type with excess organic diisocyanate and subsequently adding to the reactive mixture a polyhydric alcohol and water.

A profiled leather cushion is ordinarily used for checking the movement of the picker stick on power looms. Checking the picker stick is necessary because the latter propels the shuttle with considerable energy and has to be brought to a sudden stop at the end position without any appreciable deceleration distance. Although the presently used leather cushions prevent a destruction of the picker stick, they are not entirely satisfactory since they deteriorate rather rapidly and have to be replaced periodically. The presently used leather cushions do not sufficiently dampen the noise caused by the beats of the picker stick. Finally, the presently used leather cushions fail to take the load from those portions of the loom that support it and are under the impact of the picker stick.

It is, therefore, a primary object of the present invention to provide a buffer stop which is devoid of the shortcomings of the heretofore used leather cushions. Another object of the present invention is to provide a buffer stop adapted for use on power looms which stands up under the beats of the picker stick. Another object of the invention is to provide a buffer stop for power looms which need not be replaced after short periods of use. Another object is to provide a buffer stop which dampens the noise of the picker stick. A further object is to provide a buffer stop which prevents wear and tear of those parts of the loom which hold it. Still further objects will become apparent from the following description with reference to the accompanying diagrammatic drawings in which Figure 1 is a diagrammatic illustration of a portion of a power loom equipped with a buffer stop according to the invention;

In accordance with this invention, generally speaking, the foregoing objects and others are accomplished by providing a buffer stop comprising an elastic body made up of a plurality of layers of polyurethane rubber and a holder made of a rigid material, said elastic body being clamped into and supported by said holder along major portions of its surface. Due to the multiple layer construction of the buffer stop of the invention, it can be given a spring diagram which has a steep slope but no discontinuity. On the other hand, the rigid holder prevents an undesirable yielding of the elastic body and, thus, assists the same in absorbing the shocks.

Particularly good results are obtained if the elastic body of the buffer stop of the invention comprises at least one layer of a foamed polyurethane rubber placed between two layers of homogeneous polyurethane rubber. The holder may be made of any suitable rigid material, such as metal, leather or plastic.

In a specific embodiment of the invention, at least the bottom surface of the elastic polyurethane rubber body rests on a supporting element, such as a metal mount. It is preferred, however, to also support the elastic body on both sides so as to prevent it from giving way in the three main directions. The elastic polyurethane rubber body is advantageously put under a certain pre-stress from both sides, i.e., transversely to the direction of the impact, whereby the spring diagram can be reduced to a substantial extent.

If it is desired to decrease the elasticity of the buffer stop of the invention in order to adapt its properties to the design of the loom on which it is used, the resilient polyurethane rubber body may be provided with a covering layer of leather. This leather covering will be gradually destroyed during the operation of the loom but the polyurethane rubber body beneath it will remain unaffected.

In most cases, the elastic polyurethane rubber body of the buffer stops of the invention will have a rectangular cross-section. However, depending upon the design of the loom on which the buffer stop is used, it may be preferable to give the elastic polyurethane rubber body a disk-like, ellipsoidal or spheroidal shape and to mount the elastic body in a suitable shaped metal holder.

Figure 1:
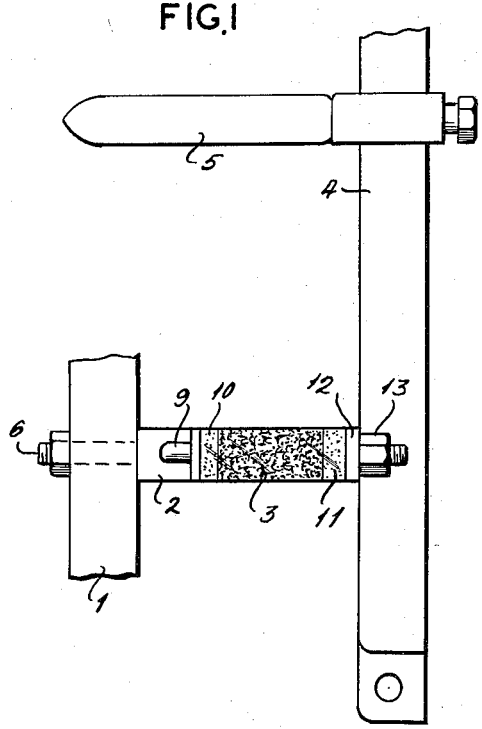
Figure 2:
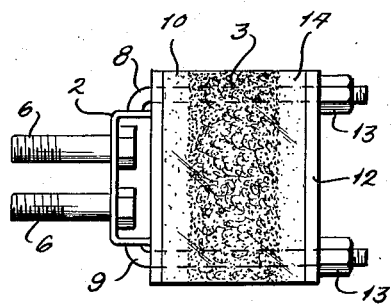
Figure 2 is a top view of the buffer stop shown in Figure 1.

Referring more particularly to the drawings, the buffer stop diagrammatically shown in Figures 1 and 2 comprises the elastic polyurethane rubber body 3 clamped into the metal holder 2 which is mounted on the supporting member 1. The buffer stop 2, 3 serves to check the beats of the picker stick 4 which drives the shuttle 5.

According to Figure 2, the metal support 2 has the holding bolts 6 and a fork-like arrangement of two bolt studs 8 and 9. The elastic polyurethane rubber cushion consists of the middle layer 3 made of polyurethane rubber foam and the two external layers 10 and 11 made of homogeneous polyurethane rubber bonded to the middle layer. The elastic polyurethane rubber body 3, 10, 11 is somewhat squeezed by forks 8 and 9 and, thus, subjected to a transverse pre-stress. The external polyurethane rubber layer 11 is covered with the leather layer 12 while the bolt nuts 13 clamp the cushion into the bracket 2 in a detachable manner. By tightening the bolt nuts 13, the pre-stress on the cushion can be varied.

Figure 3:
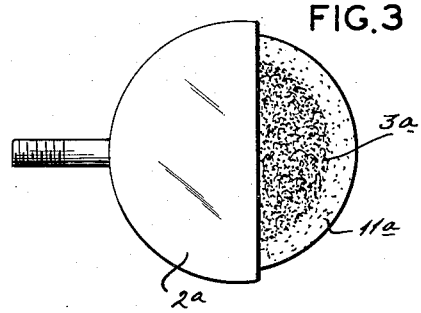
Figure 3 is a side view of a buffer stop according to another embodiment of the present invention.

The buffer stop shown in Figure 3 comprises the disk-shaped elastic polyurethane rubber body 3a held in the bell-shaped metal member 2a. The polyurethane rubber body is formed by a core of polyurethane rubber foam and a cylindrical external layer 11a made of homogeneous polyurethane rubber. Again, depending upon the kind of picker-stick used, the top surface can be covered by an additional protective layer of leather or similar material (not shown in Figure 3).

Figure 4:
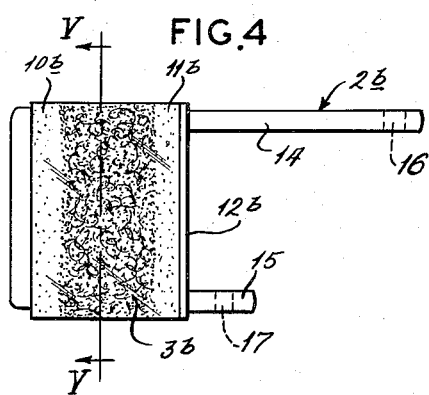
Figure 4 is a plan view of a buffer stop having a different kind of holder than the buffer stops shown in Figures 1 and 2.
Figure 5:
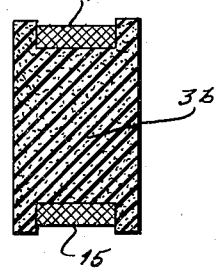
Figure 5 is a cross-sectional view taken on the line V—V of Figure 4.

The buffer stop shown in Figures 4 and 5 differs from the one shown in Figures 1 and 2 in that the cushion consisting of the layers 10b, 3b and 11b and the protective leather cover 12b is held by an L-shaped supporting member (holding loop) 2b made of leather or a rigid plastic. The legs 14 and 15 of the supporting member 2b engage the narrow sides of the cushion 10b, 3b, 11b and thereby provide a transverse support. The cushion is inserted in such manner as to give it a certain pre-stress. The holes 16 and 17 in the supporting member are used for mounting the buffer stop. If desired, the supporting member 2b can be made from metal rather than leather or plastic.

Any suitable formulation may be used to produce the polyurethane rubber layers contained in the buffer stops of the invention. Suitable formulations and starting materials for polyurethane rubber have been disclosed in the literature, such as in U.S. Patents 2,620,516, 2,621,166, 2,729,618, 2,764,565 and 2,778,810, the disclosure of which is incorporated herein by reference. The following examples show the preparation of a foamed polyurethane rubber and a homogeneous polyurethane rubber adapted to serve as materials of construction for the elastic polyurethane rubber body of the buffer stops of the invention, but it is to be understood that these formulations are given by way of illustration and not of limitation.

*Example 1*

1,000 parts by weight of an hydroxyl polyester obtained by thermal esterification of about 11 mols of adipic acid with about 12 mols of ethylene glycol and having an hydroxyl number of about 52 and an acid number of about 1 are heated at a temperature of about 135° C. and under a vacuum of about 12 mm. until the formation of bubbles has stopped and the polyester is completely free from water. Now, 200 parts by weight of naphthylene-1,5-diisocyanate are added to the dehydrated polyester at 135° C. while stirring. As soon as the temperature starts to drop, 20 parts of butylene glycol-1,4 are stirred into the mixture within a period of one minute at about 130° C. and subsequently 6 parts by weight of water are added while stirring. The resulting mixture forms a foamed or cellular polyurethane rubber on standing and is cured at a temperature of about 110° C. for about 24 hours.

*Example 2*

1,000 parts by weight of an hydroxyl polyester obtained by thermal esterification of about 11 mols of adipic acid with about 12 mols of ethylene glycol and having an hydroxyl number of about 52 and an acid number of about 1 are heated at a temperature of about 135° C. and under a vacuum of about 12 mm. until the formation of bubbles has stopped and the polyester is completely free from water. Now, 300 parts by weight of naphthylene-1,5-diisocyanate are added at 135° C. while stirring. As soon as the temperature starts to drop, 70 parts by weight of butylene glycol-1,4 are stirred into the mixture at about 135° C. The resulting mixture is poured into a mold and maintained therein at a temperature of about 110° C. for about 24 hours to form a homogeneous polyurethane rubber.

Although certain representative embodiments and details have been shown for the purpose of illustrating this invention, it will be apparent to those skilled in the art that various changes and modifications may be made therein without departing from the spirit and scope of the invention except as set forth in the claims.

What is claimed is:

1. A buffer stop for a loom adapted to check the movement of a picker stick which comprises an elastic cushion supported on a rigid holder, said cushion comprising a layer of elastic cellular polyurethane and a layer of homogeneous polyurethane adjacent each of two opposite sides of the cellular polyurethane layer, one of said homogeneous polyurethane layers being adjacent the surface of the cushion facing the picker stick when the cushion is mounted on a loom.

2. The buffer stop of claim 1 wherein the layer of homogeneous polyurethane adjacent the surface facing the picker stick is covered with a layer of leather.

3. The buffer stop of claim 1 wherein the cushion is supported by a metal support.

References Cited in the file of this patent

UNITED STATES PATENTS

| | | |
|---|---|---|
| 2,111,489 | Haupt | Mar. 15, 1938 |
| 2,754,852 | Moore | July 17, 1956 |

OTHER REFERENCES

"3 New Foams," Modern Plastics, vol. 30, No. 8, April 1953, pages 85–87.